United States Patent
Eugster et al.

(10) Patent No.: US 9,795,157 B2
(45) Date of Patent: Oct. 24, 2017

(54) METHOD FOR PRETREATING GRAIN BEFORE MILLING

(71) Applicant: General Mills, Inc., Minneapolis, MN (US)

(72) Inventors: Walter Eugster, Niederuzwil (CH); Jurgen Winter, Niederuzwil (CH); Uwe Schill, Winterthur (CH)

(73) Assignee: General Mills, Inc., Minneapolis, MN (US)

( * ) Notice: Subject to any disclaimer, the term of this patent is extended or adjusted under 35 U.S.C. 154(b) by 335 days.

(21) Appl. No.: 14/288,024

(22) Filed: May 27, 2014

(65) Prior Publication Data

US 2014/0255582 A1    Sep. 11, 2014

Related U.S. Application Data

(62) Division of application No. 12/495,930, filed on Jul. 1, 2009, now abandoned.

(51) Int. Cl.
| | |
|---|---|
| *B02B 5/00* | (2006.01) |
| *A23L 1/308* | (2006.01) |
| *B02B 1/04* | (2006.01) |
| *B02B 3/00* | (2006.01) |
| *B02B 3/04* | (2006.01) |
| *B02B 5/02* | (2006.01) |
| *A23L 7/10* | (2016.01) |
| *A23L 33/21* | (2016.01) |
| *A23L 33/22* | (2016.01) |
| *B02B 1/06* | (2006.01) |

(52) U.S. Cl.
CPC ............... *A23L 1/308* (2013.01); *A23L 7/10* (2016.08); *A23L 33/21* (2016.08); *A23L 33/22* (2016.08); *B02B 1/04* (2013.01); *B02B 3/00* (2013.01); *B02B 3/04* (2013.01); *B02B 5/02* (2013.01); *B02B 1/06* (2013.01)

(58) Field of Classification Search
CPC .. B02B 3/00; B02B 3/045; B02B 3/12; B02B 3/14; B02B 5/02
USPC ............... 99/518, 519, 520, 521, 522, 525; 426/482, 481, 483
See application file for complete search history.

(56) References Cited

U.S. PATENT DOCUMENTS

| | | | |
|---|---|---|---|
| 778,193 A | 12/1904 | Hartmann | |
| 4,597,977 A | 7/1986 | Brown | |
| 5,036,757 A | 8/1991 | Mueller | |
| 5,076,157 A | 12/1991 | Satake | |
| 5,394,792 A | 3/1995 | Satake | |
| 5,650,018 A | 7/1997 | Mueller | |
| 5,846,591 A * | 12/1998 | Satake | ............... B02B 3/00 426/483 |
| 6,457,404 B1 | 10/2002 | Munesada et al. | |
| 6,832,545 B2 | 12/2004 | Satake | |

FOREIGN PATENT DOCUMENTS

| | | |
|---|---|---|
| DE | 1164210 | 2/1964 |
| DE | 123159 | 12/1975 |
| DE | 2952049 | 12/1979 |
| DE | 3603086 | 5/1993 |
| EP | 0646414 | 4/1995 |
| EP | 0662864 | 7/1995 |
| EP | 0801984 | 10/1997 |
| EP | 0810031 | 12/1997 |
| EP | 1785192 | 5/2007 |
| EP | 1800541 | 6/2007 |
| GB | 2268386 | 1/1994 |
| WO | 2004/041434 | 5/2004 |
| WO | 2004/060564 | 7/2004 |
| WO | 2007/136891 | 11/2007 |
| WO | 2007/137106 | 11/2007 |

* cited by examiner

*Primary Examiner* — Reginald L Alexander
(74) *Attorney, Agent, or Firm* — Diederiks & Whitelaw, PLC; Gregory P. Kaihoi, Esq.

(57) ABSTRACT

Cereal grain is pretreated before milling, by selectively removing a first fraction of husk components of the cereal, wherein the first fraction includes the outer husk components of the dampened cereal, and wherein 0.2 to 2% by weight of the cereal is removed, then dampening and conditioning the cereal, then selectively removing a second fraction of husk components of the cereal, wherein the second fraction substantially contains dietary fibers of the dampened cereal. The method makes it possible to efficiently obtain contamination-free total dietary fibers. An apparatus for carrying out the method, and advantageous uses of the total dietary fibers are also described.

2 Claims, 6 Drawing Sheets

METHOD FOR PRETREATING GRAIN BEFORE MILLING

This application is a division of application Ser. No. 12/495,930, filed Jul. 1, 2009.

The invention relates to the field of milling, in particular to the preparatory grinding treatment of cereals.

In a simplified depiction, the cereal grain has a triple husk construction. The outer husk layer comprises the epidermis, long and cross cells and also tube cells. Said outer husk layer can make up up to 5.5% by weight of the total grain. The next layer to the inside is a double layer comprising a "coloring layer" and a colorless layer; a portion of approximately 2.5% by weight of the total grain is assumed for this double layer. The next layer to the inside is referred to as the aleuron layer and comprises approximately 7% by weight of the total grain. The interior of the grain contains the kernel (approx. 2.5% by weight of the entire grain) and the actual endosperm which makes up the rest to a total of 100% by weight.

It is known to pretreat the grain by peeling, abrading and/or polishing in such a manner that as few husk components as possible enter the actual grinding process.

DE 1 164 210 proposes a multi-stage method, in which the husk components are stripped off in a quantity of 2.8 to 3.6% by weight of the cereal grain in a first step. In a second step, a further 0.4 to 2.1% by weight of the cereal grain is also stripped off. Overall, in this method, a total of between 3.2 and 5.7% by weight of the cereal grain is stripped off.

It is furthermore known that environmental poisons and/or contaminations can be contained in an outer layer of the cereal. The fact that these can be removed by removing part of the outermost husk of the cereal is described, for example, in EP 801 984 B1.

The invention is based on the object of providing a method which can be reliably used both to remove contaminated outermost layers of the cereal and to supply as substantial a portion of the cereal as possible for a value-adding use. In addition, the invention is intended to be carried out as simply, efficiently and cost-effectively as possible.

This object is achieved by the subject matter of the independent patent claims.

The method for pretreating grain before milling according to the invention comprises the following steps:
a) providing cereals;
b) optionally: dampening and conditioning the cereal, in particular for a period of time of 1 hour, preferably for 10 minutes, furthermore preferably for approximately 5 seconds to 5 minutes, furthermore preferably for approximately 5 seconds to 30 seconds, and particularly preferably for approximately 8 seconds to 15 seconds.

It has been demonstrated that this step can be dispensed with, depending on the degree of contamination and type of contamination. In general, with previous dampening and conditioning of the cereal, more outer husk components can be removed in the subsequent step c) if this is desirable or necessary (due to the degree of contamination and/or type of contamination).

c) Selectively removing a first fraction of husk components of the cereal as per step a) or of the cereal obtained from step b), wherein said first fraction substantially comprises the outer husk components of the dampened cereal, and wherein 0.2 to 2% by weight of the cereal is removed, preferably 0.2 to 1% by weight, and particularly preferably 0.2 to 0.5% by weight;

d) dampening and conditioning the cereal obtained from step c) in particular for a period of time of 0.5 to 30 minutes, preferably for 0.5 to 15 minutes, and particularly preferably for approximately 1 to 5 minutes;

e) selectively removing a second fraction of husk components of the cereal obtained from step d), wherein said second fraction substantially contains dietary fibers of the dampened cereal.

In step c), only the surface layer is worn down to an extent such that contaminations, such as environmental poisons and/or other contaminations, are removed. It has been surprisingly demonstrated that the removal of just 0.2 to 0.5% by weight is entirely sufficient for this in order to obtain substantially contamination-free cereal grains. In the step e), a further layer is removed, said layer then being substantially free from contamination and substantially containing dietary fibers of the cereal. The contamination-free dietary fibers obtained in such a way can be supplied for further use as valuable components.

Within the context of the present invention, dietary fibers are understood as meaning the total dietary fibers determined as per AOAC 985.29.

Cereal which has "storage moisture" or "grinding moisture" can be provided in step a).

The provision of cereal which has "grinding moisture" takes place with a moisture content of 14% by weight, preferably 14 to 20% by weight, furthermore preferably 15 to 20% by weight, and particularly preferably 15 to 17% by weight, wherein said moisture is distributed as substantially homogeneously as possible in the cereal grain, in a manner optimum for the grinding process.

The provision of cereal which has "storage moisture" preferably takes place with a moisture content of <14% by weight, preferably 8 to 13.99% by weight, and particularly preferably 10 to <13.99% by weight.

It has been demonstrated that the cereal in the steps b) and d) can be dampened with very little water. Typically, for example, from 0.1 to 3.5% by weight, and preferably 0.2 to 2.5% by weight, of water is added (based on the resulting overall weight) if cereal which has the abovementioned "grinding moisture" is provided.

If cereal which has the abovementioned "storage moisture" is provided, then typically from 0.1 to 4% by weight, and preferably 0.2 to 2.5% by weight, of water is added (based on the resulting overall weight).

The conditioning in steps b) and d) can take place directly during the dampening of the cereal, for example in a dampener turbolizer. However, it is also possible for only part of the conditioning to take place at the same time as the dampening (for example in a screw conveyor into which water is fed), with the dampened cereal then being subsequently conditioned separately (for example in a screw conveyor into which no additional water is fed any longer).

The dampening and conditioning of the cereal in steps b) and d) lead surprisingly rapidly to sufficient moisture contents in the outer layers of the grain, making the subsequent removal of husk layers in steps c) and e) much easier.

Typically, dampening in step b) takes place during a period of time of ≤1 hour, preferably for ≤10 minutes, furthermore preferably for approximately 5 seconds to 5 minutes, and particularly preferably for approximately 8 seconds to 30 seconds. Said dampening preferably takes place in a dampener turbolizer.

Typically, in step d), dampening and conditioning take place for approximately 0.5 to 30 minutes, preferably 0.5 to 15 minutes, and particularly preferably for between 1 and 5 minutes. Said dampening preferably takes place in a dampening and retaining screw conveyor.

Whereas, in step c), only precisely so much surface layer of the cereal is abraded for a substantially contamination-free residual grain to be obtained, the intention, in step e), is for a fraction having the highest possible dietary fiber portion to be obtained, the intention being that the endosperm is as far as possible not damaged. The portion of the second fraction obtained in step e) in percent by weight of the pure grain can vary as a function of the type of cereal and the contaminated layer removed in step c). However, suitable control or regulation of the method can easily be determined by routine tests; for this purpose, the content of total dietary fibers of the second fraction and the content of starch (as an indication of damage to the endosperm) can be used (individually or in combination).

Therefore, in preferred embodiments, the second fraction removed in step e) has a total dietary fiber content of ≥60% by weight, preferably ≥70% by weight, and particularly preferably ≥80% by weight.

In further preferred embodiments, the second fraction removed in step e) has a starch content of ≤20% by weight, preferably ≤15% by weight, and particularly preferably ≤10% by weight.

In the context of the invention, the starch content is determined in accordance with Schweizerische Lebensmittelbuch [Swiss Food Manual] SLMB (2002), chapter 3.6.1.

In particularly preferred embodiments of the invention, step e) is carried out in a plurality of partial steps $e_1$) to $e_n$). The fractions obtained in such partial steps can in particular contain differing quantities of the cereal (in percent by weight of the total weight of the cereal used). This enables particularly fine access to a maximally exposed endosperm to be achieved; in particular, a smaller isolated fraction can be selected the greater the amount of dietary fibers already abraded.

Particularly advantageously, the fractions or partial quantities thereof obtained in the partial steps $e_1$) to $e_n$) can be mixed with one another in such a manner that the mixture has a total dietary fiber content of ≥60% by weight, preferably ≥70% by weight, and particularly preferably ≥80% by weight. The first partial fractions typically have a total dietary fiber content of >80% by weight, in particular >85% by weight. Later partial fractions—despite a smaller total dietary fiber content—can also still be isolated and added to the earlier partial fractions as long as this does not cause the total dietary fiber content to fall below a desired amount (for a maximum tolerated starch content, see below, to be exceeded).

Furthermore advantageously, the fractions or partial quantities thereof obtained in the partial steps $e_1$) to $e_n$) can be mixed with one another in such a manner that the mixture has a starch content of ≤20% by weight, preferably ≤15% by weight, and particularly preferably ≤10% by weight. The first partial fractions typically have a starch content of <6% by weight, in particular of ≤5% by weight. Later partial fractions—despite a higher starch content—can also still be isolated and added to the earlier partial fractions as long as this does not cause a maximum tolerated starch content to be exceeded (or the total dietary fiber content to fall below a desired amount).

The cereal can advantageously be dampened and conditioned again between the individual partial steps $e_1$) to $e_n$).

In further preferred embodiments, the dampening and conditioning in the steps b) and d) and, if appropriate, between the partial steps $e_1$) to $e_n$) take place with a dampener turbolizer or with a dampening and retaining screw conveyor. A dampener turbolizer has surprisingly turned out to be particularly suitable for use in step b) whereas the dampening and retaining screw conveyor has proven particularly successful in step d) and, if appropriate, between the partial steps $e_1$) to $e_n$); in particular, the sequential use of a dampening screw conveyor (with addition of water) and a subsequent retaining screw conveyor (without addition of water) has proven particularly advantageous.

In a particularly advantageous manner, the components of the first and/or second fraction in the steps c) and e) are removed from the cereal grain substantially by grain/grain friction. Such friction is particularly gentle, being expressed by low breakage of the grain. Alternative methods substantially based on grain/metal or grain/stone friction are less gentle and are therefore unsuitable in many cases for obtaining the selectivity, which is desired in the steps c) and e), in the removal of husk components.

A further aspect of the invention relates to a plant for carrying out the above-described method. Such a plant according to the invention comprises, in the product flow direction:
 a) optionally: at least one tempering bin for preconditioning the cereal to a defined moisture content;
 b) optionally: at least one dampening unit for dampening and conditioning the cereal, preferably a dampener turbolizer;
 c) at least one device for processing the surface of the cereal by peeling;
 d) at least one dampening unit for dampening and conditioning the cereal again, preferably a dampening and retaining screw conveyor;
 e) at least one device for processing the surface of the cereal by peeling.

It goes without saying that, given suitable process management (for example with temporary storage of intermediate products), if appropriate the same dampening unit can be used in the steps b) and d); similarly, in the steps c) and d), the same device for processing the surface by peeling can be used. However, continuous operation of the plant with separate devices for treatment of the surface by peeling in the steps c) and e) is preferred.

Particularly advantageously, the peeling in the device(s) for processing the cereal by peeling can be obtained substantially by grain/grain friction, as already explained above in conjunction with the method according to the invention.

The device for processing the surface by peeling in the above-described plants particularly advantageously has the following components:
 a rotatably mounted rotor;
 a stator which in particular is provided with processing tools;
 at least one screen basket which is in particular formed from one or more screen plates and is preferably arranged on the stator, the at least one screen basket surrounding the rotor in such a manner that a processing zone is formed;
the rotor comprising a hollow shaft through which air can be fed into the processing zone, and the rotor having, in the region of the processing zone, a roller which in particular is provided with processing tools.

As processing tools, flat segments can be provided on the stator; however, said segments may also be provided with baffle bars, cams or the like.

Protruding strips, studs or the like can be provided as processing tools on the rotor.

The screen baskets can be matched in particular in the size of their holes to the specific use (in particular to the particular type of cereal) by routine tests carried out by an expert.

A further aspect of the invention relates to the use of dietary fibers, obtained by an above-described method, in particular by an above-described plant, as an additive in foodstuffs, in particular baked goods, preferably breads; cereals; snacks, in particular bars; drinks; milk products, in particular yoghurt; food supplements and diet foods. According to the invention, substantially contamination-free dietary fibers can be obtained in a particularly simple manner and in high yield and can be supplied for further use. The grain product which is obtained and treated (freed from an outer layer of the husk components) can likewise be further processed.

The invention is explained below with reference to exemplary embodiments and figures without restricting the subject matter of the invention to said embodiments. In the figures.

Figure 1:
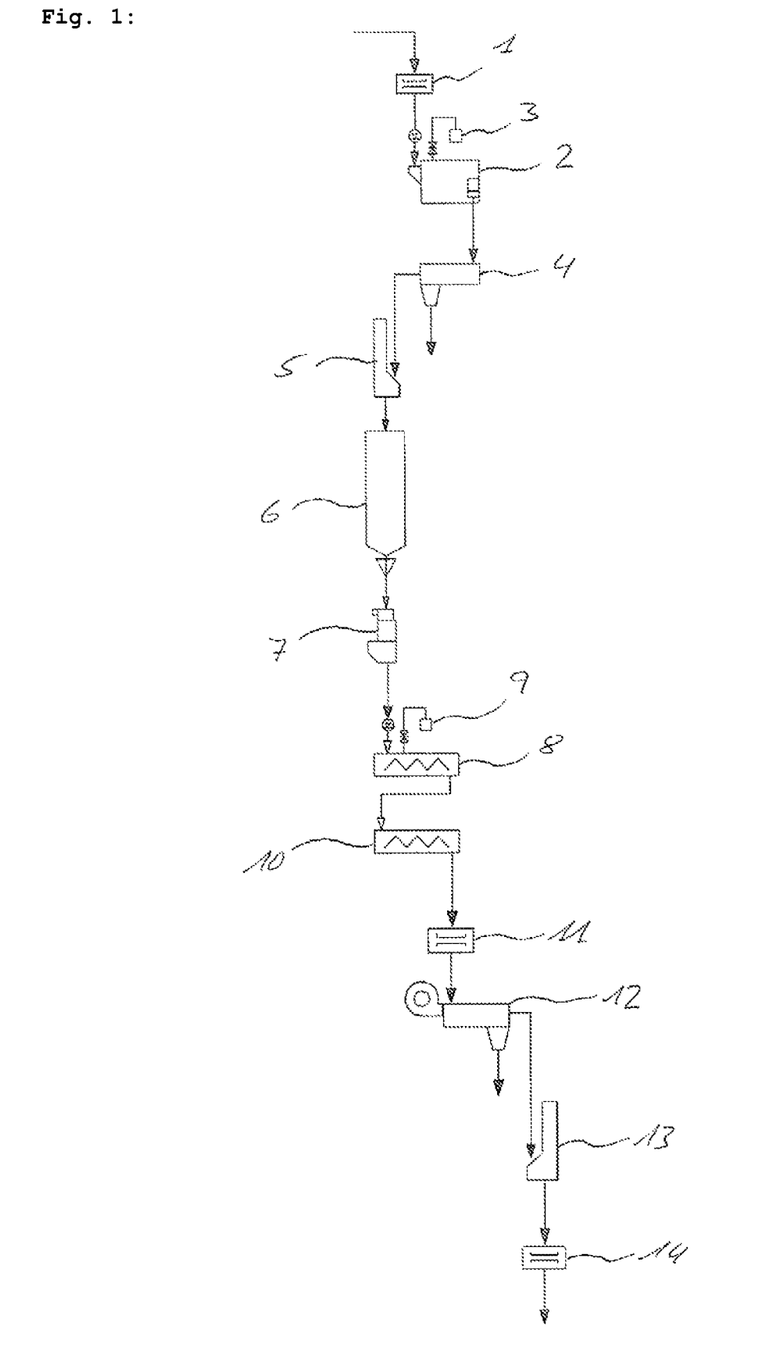
FIG. 1 shows a flow diagram of a variant for carrying out the method.

In the flow diagram in FIG. 1 of a variant for carrying out the method, cereal having a defined grinding moisture is supplied from a tempering bin (not shown) to the process. The cereal first of all passes through a magnet 1 for sorting out metallic parts. The cereal is subsequently supplied to a dampener turbolizer 2 which has a water supply 3 for dampening the cereal. The dampener turbolizer 2 is explained in more detail in the description of FIG. 6. The dampened cereal is subsequently supplied to a first device for treatment of the surface of the cereal by peeling, namely a "light peeler" 4; the latter is explained in more detail in conjunction with FIG. 2 and FIG. 3. However, instead of a light peeler, a peeler 12 may also be used; the latter is explained in more detail in conjunction with FIGS. 4 and 5. The fiber fraction leaving the light peeler 4 (or peeler 12) can be supplied for a further use (not illustrated). The cereal fraction is conducted through an aspiration passage 5. The loose parts which were not removed by the screen jacket of the light peeler are sucked off here. The cereal is then supplied to a depot 6 in which it can be temporarily stored in order to compensate for different capacities of the individual process steps. It can be ensured by means of a pair of scales 7 that defined quantities of cereal are supplied to the subsequent process stages, which is essential in particular for the later dampening. The cereal is dampened and at the same time conveyed in a dampening screw conveyor 8; the dampening screw conveyor 8 is fed with water via a water supply 9. The dampened cereal is subsequently conditioned again in a retaining screw conveyor 10. The construction of the dampening screw conveyor 8 and retaining screw conveyor 10 is identical except for the water supply and is explained in more detail in conjunction with FIG. 7. The dampened cereal is again guided past a magnet 11 in order to sort out any metallic contamination. The cereal is subsequently supplied to a second device for treatment of the surface of the cereal by peeling, in this case to a peeler 12; the latter is explained in more detail in conjunction with FIG. 4 and FIG. 5. However, in this method step, a light peeler 4 can alternatively also be used if a more gentle treatment with less abrasion of husk material is desired. The fiber fraction leaving the peeler 12 can be supplied for a further use (not illustrated). The cereal passes through a further aspiration passage 13 and a further magnet 14 and is subsequently supplied to the grinding process.

Figure 2:
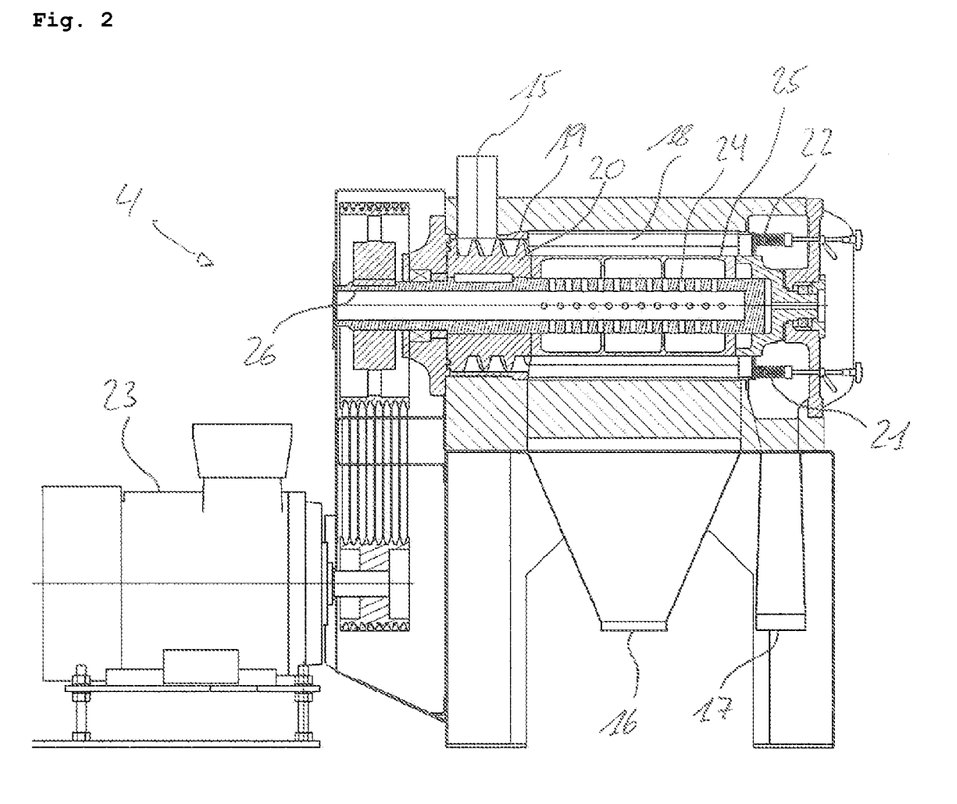
FIG. 2 shows a longitudinal section of a light peeler.
Figure 3:
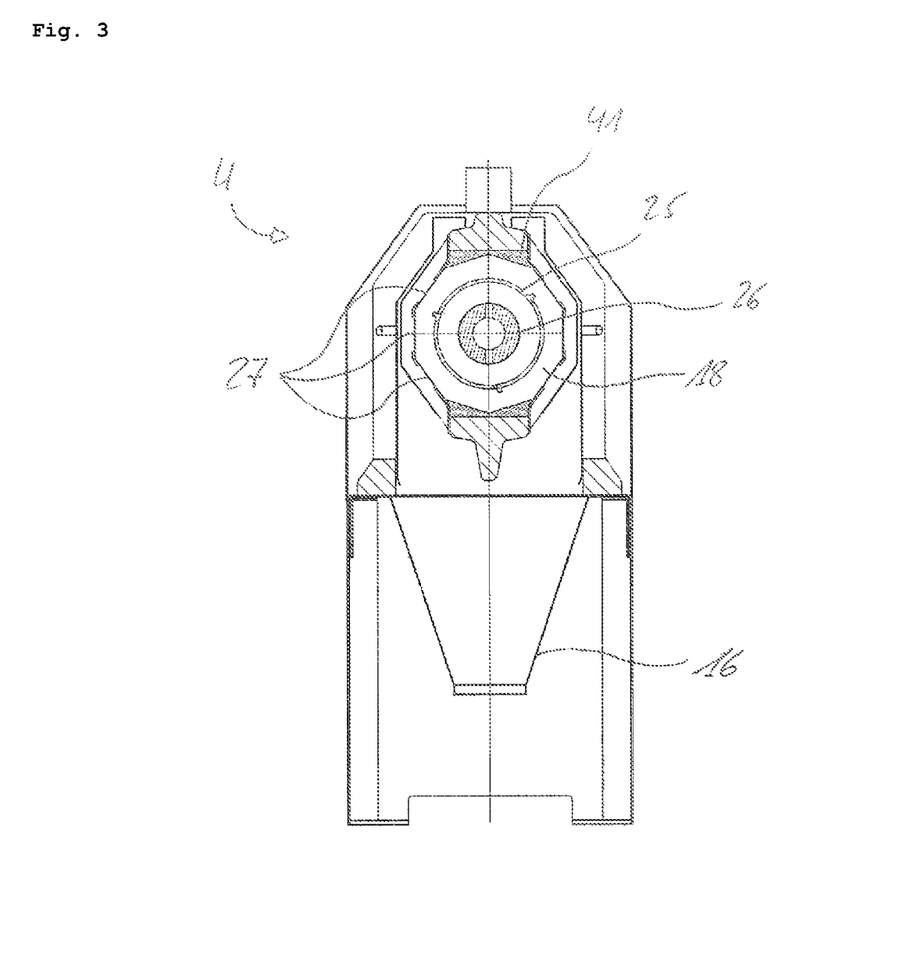
FIG. 3 shows a cross section of a light peeler.

FIG. 2 and FIG. 3 illustrate the light peeler 4 in more detail. The cereal is supplied to the light peeler 4 via a product inlet 15 and passes to a feed screw 20. The light peeler 4 has a stator 19 and a rotor 25. A treatment space 18 for the cereal is formed between the rotor 25 and stator 19 and also screen plates 27 (FIG. 3). The distance between the rotor 25 and stator 19 can be reduced at the top and bottom by putting the segments 41 thereunder in order to obtain a more intensive treatment of the process product. The distance between the screen plates 27 and rotor 25 can likewise be adjusted; a greater distance is associated with a more gentle treatment of the process product. The rotor 25 has a hollow shaft 26 which is driven via a motor 23. The hollow shaft has air openings 24 via which air can be supplied to the treatment space 18. By regulation of the backing-up devices 21 and 22, the intensity of the treatment in the treatment space 18 can be regulated by the backing-up pressure of the cereal in the light peeler 4 being adjusted. The fiber fraction leaves the light peeler 4 via the outlet 16; the treated cereal leaves the light peeler 4 via the outlet 17.

Figure 4:
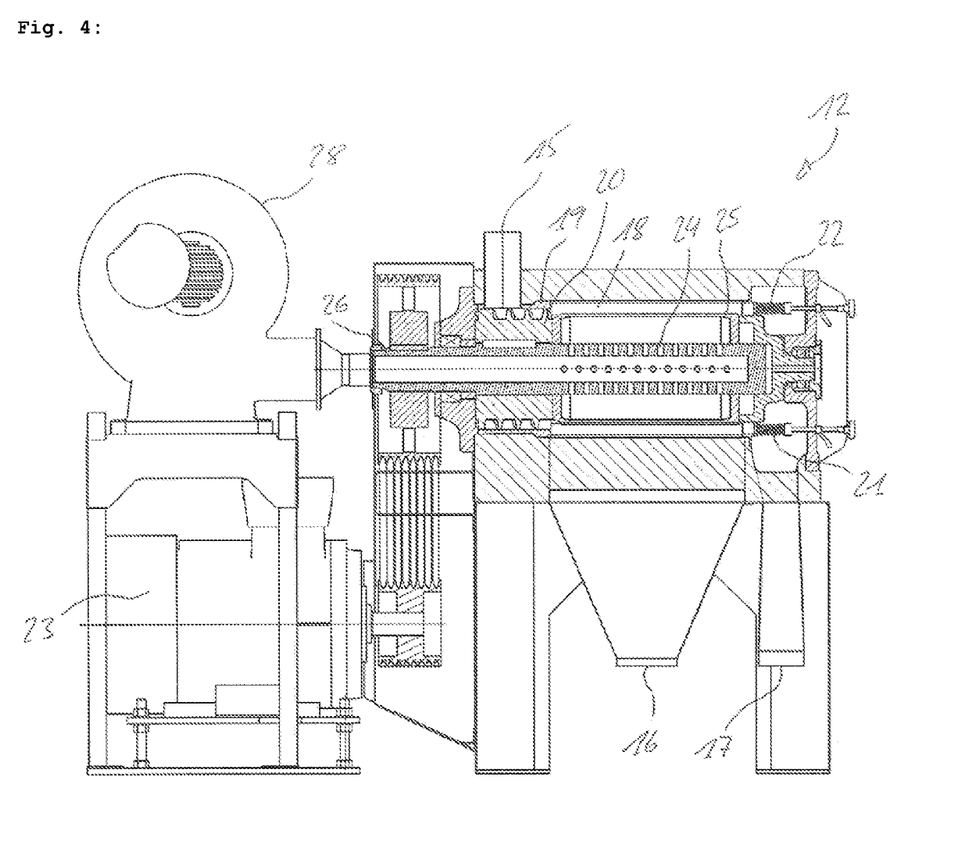
FIG. 4 shows a longitudinal section of a peeler.
Figure 5:
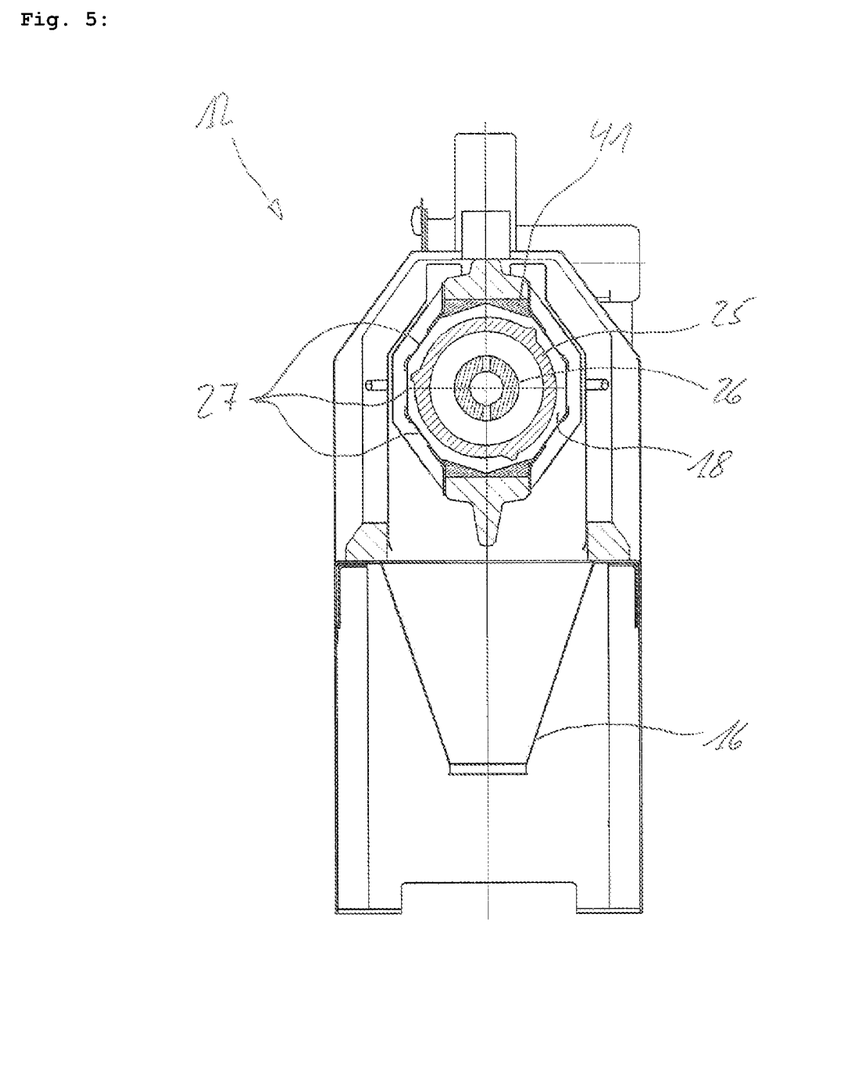
FIG. 5 shows a cross section of a peeler.

The peeler 12 is illustrated in more detail in FIG. 4 and FIG. 5. Parts having substantially the same function are referred to with the same reference numbers as in the light peeler 4. The cereal is supplied to the peeler 12 via a product inlet 15 and passes to a feed worm 20. The peeler 12 has a stator 19 and a rotor 25. A treatment space 18 for the cereal is formed between the rotor 25 and stator 19 and also screen plates 27 (FIG. 5). The distance between the rotor 25 and stator 19 can be reduced at the top and bottom by putting the segments 41 thereunder in order therefore to obtain a more intensive treatment of the process product. The distance between the screen plates 27 and the rotor 25 can likewise be adjusted; a larger distance is associated with a more gentle treatment of the process product. The rotor 25 has a hollow shaft 26 which is driven via a motor 23. The hollow shaft has air openings 24 via which air can be supplied to the treatment space 18 by means of a ventilator 28, as a result of which the severing of the husk fraction can be made easier and completed. The treatment space 18, which is narrower in the peeler 12 in comparison to the light peeler 4, also intensifies the treatment of the cereal (cf. FIG. 3). By regulating the backing-up devices 21 and 22, the intensity of the treatment in the treatment space 18 can be regulated by the backing-up pressure of the cereal in the peeler 12 being adjusted. The fiber fraction leaves the peeler 12 via the outlet 16; the treated cereal leaves the peeler 12 via the outlet 17.

Figure 6:
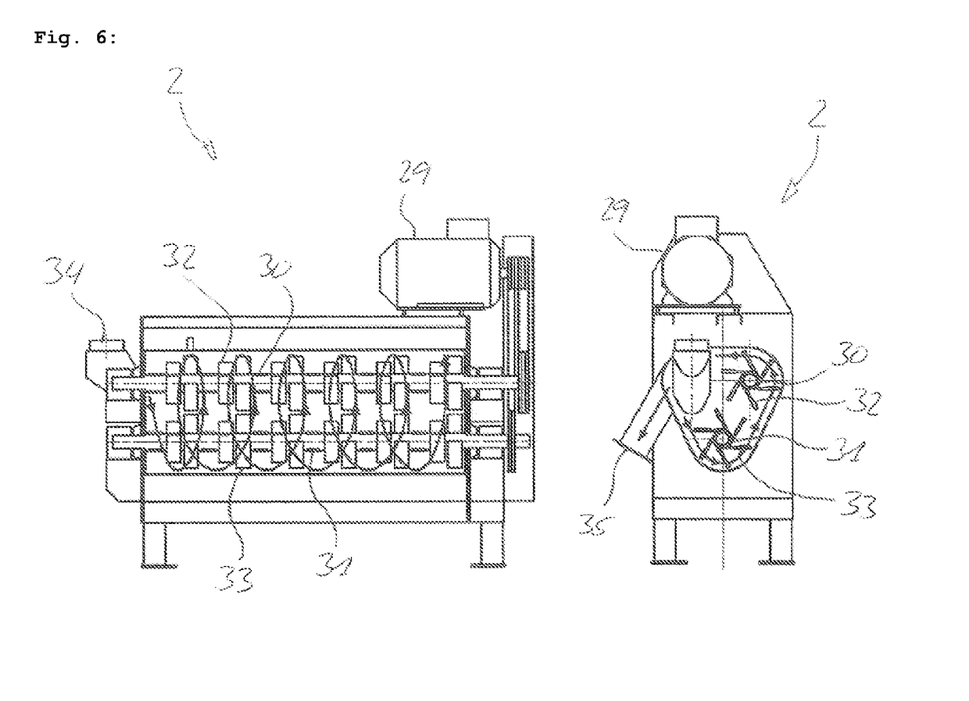
FIG. 6 shows a longitudinal section (on the left) and cross section (on the right) of a dampener turbolizer.

FIG. 6 shows the dampener turbolizer 2 in detail. The cereal is supplied to the dampener turbolizer 2 via the product inlet 34 and is conducted through the dampener turbolizer in a helical direction (indicated by the arrow line in the interior of the dampener turbolizer 2). Water is supplied to the interior of the dampener turbolizer 2 in a metered manner via a water feed (not shown in detail). An upper shaft 30 and a lower shaft 31 are arranged in the interior of the dampener turbolizer 2; paddles 32 and 33 are provided on said rotating shafts in such a geometry and arrangement that the above-described, helical conveying movement is achieved. The shafts 30 and 31 are driven via a common motor 29. The dampened cereal leaves the dampener turbolizer via the product outlet 35.

Figure 7:
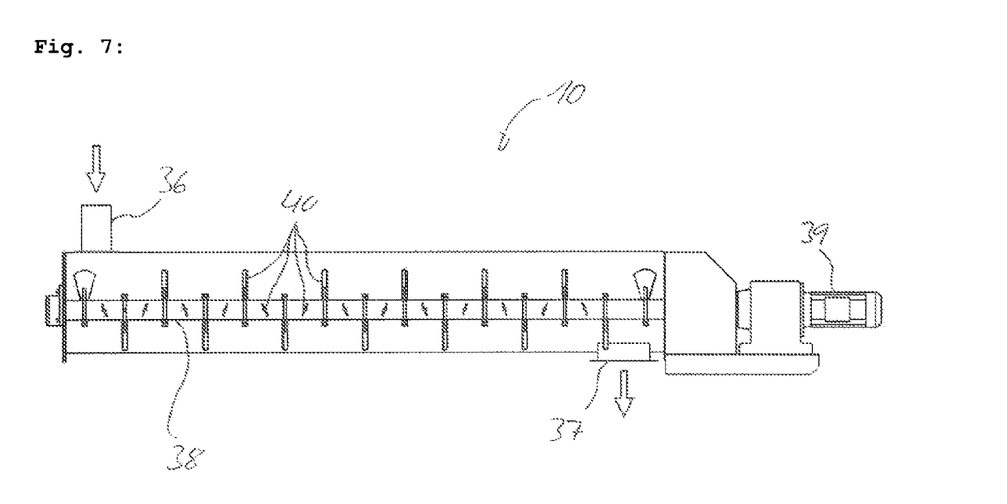
FIG. 7 shows a cross section of a dampening and retaining screw conveyor.

FIG. 7 shows a retaining screw conveyor 10 in detail. The cereal is supplied to the retaining screw conveyor via a product inlet 36. A shaft 38 on which paddles 40 are provided in such a geometry and arrangement that a conveyor movement is achieved is arranged in the interior of the retaining screw conveyor 10. The cereal leaves the retaining screw conveyor via the product outlet 37. The shaft 38 is driven by the motor 39. A dampening screw conveyor (not shown in detail) can be formed in an analogous manner, but with a water supply preferably being provided in the front part of the interior in the product flow direction.

The following results were obtained (by way of example) with the method according to the invention:

Swiss quality wheat with a storage moisture of 12.6% by weight and an ash content of 1.83% with reference to the dry substance was used as the cereal. Prior to the experiment, the wheat was dampened to a moisture content of approximately 16% by weight. The subsequent tempering time prior to the experiment lasted 18 h.

A dampener turbolizer 2 was used for the dampening. The treatments of the surface were carried out using a peeler 12 (MHXM-W; Buhler AG).

The peeler 12 was always operated at the following settings:
- Product input rate: 3 t/h
- Rotational speed of the rotor: 335 rpm
- Screen perforation: 1.1 mm×12 mm
- Distance of rotor from segment 41: 13 mm
- Distance of rotor from screen: 8 mm.

Prior to each surface treatment in the peeler 12, dampening took place in the dampener turbolizer (below: experiments 1 to 4), with a flow time through the dampener turbolizer of approximately 0.3 minute, and with the following quantities of water supplied for the dampening:
- Experiment 1: 0.2% by weight
- Experiment 2: 0.4% by weight
- Experiment 3: 0.6% by weight
- Experiment 4: 1.4% by weight Subsequently, a further husk fraction was separated off after dampening in a dampening screw conveyor followed by a retaining screw conveyor (below: experiment 5). This dampening required 2% by weight of water to be supplied, with a retaining and conditioning time in the dampening screw conveyor and the retaining screw conveyor of a total of 3 minutes prior to entry into the peeler 12.

The fractions obtained in experiments 1-5 were characterized as follows:

| Experiment # | 1 | 2 | 3 | 4 | 5 |
|---|---|---|---|---|---|
| Isolated fraction in % by weight of the total grain used | 0.36 | 0.43 | 0.50 | 1.76 | 1.4 |
| Ash | 1.90 | 1.81 | 1.86 | 2.11 | 3.37 |
| Total dietary fibers in % by weight | 88.0 | 86.5 | 85.1 | 86.4 | 61.2 |
| Starch in % by weight | 2.99 | 4.09 | 4.09 | 2.08 | 12.8 |

It is apparent from the above results that, with the method according to invention and with the use of a plant according to the invention, husk components of the cereal can be selectively isolated and successively severed without the endosperm being significantly damaged. Damage to the endosperm can at most be assumed only in fraction 5, since the starch content here has after all risen to 12.8% by weight. Nevertheless, this fraction can still also be used, since it still also contains 61.2% by weight of total dietary fibers—i.e. primarily contains the latter.

With the fraction according to experiment 1, essentially all of the contaminations have already been removed. Therefore, combining the fractions according to experiments 2 to 4 (if appropriate also including the fraction according to experiment 5, see above) results in a highly pure total dietary fiber fraction which can be supplied for further use in foodstuffs.

What is claimed is:

1. A method of supplementing foodstuffs selected from the group consisting of baked goods, cereals, snacks, drinks, milk products, food supplements and diet foods, said method comprising adding dietary fibers to the foodstuff, and the dietary fibers being obtained by a method for pretreating grain before milling, the method comprising the following steps:
   a) providing cereals;
   b) optionally: dampening and conditioning the cereal;
   c) selectively removing a first fraction of husk components of the cereal as per step a) or of the cereal obtained from step b), wherein said first fraction substantially comprises the outer husk components of the dampened cereal, and 0.2 to 2% by weight of the cereal is removed;
   d) dampening and conditioning the cereal obtained from step c); and
   e) selectively removing a second fraction of husk components of the cereal obtained from step d) to provide a treated cereal separate from said second fraction, wherein said second fraction substantially contains dietary fibers of the dampened cereal.

2. A method of supplementing foodstuffs selected from the group consisting of baked goods, cereals, snacks, drinks, milk products, food supplements and diet foods, said method comprising adding dietary fibers to the foodstuff, and the dietary fibers being obtained by a method for pretreating grain before milling, the method comprising:
   a) providing cereals;
   b) dampening and conditioning the cereal;
   c) selectively removing a first fraction of husk components of the cereal as per step a) or of the cereal obtained from step b), wherein said first fraction substantially comprises the outer husk components of the dampened cereal, and 0.2 to 2% by weight of the cereal is removed;
   d) dampening and conditioning the cereal obtained from step c); and
   e) selectively removing a second fraction of husk components of the cereal obtained from step d) to provide a treated cereal separate from said second fraction, wherein said second fraction substantially contains dietary fibers of the dampened cereal.

* * * * *